Jan. 29, 1957 L. TURZILLO ET AL 2,779,575
CONTINUOUS GROUT STRAINER
Filed Sept. 18, 1952 2 Sheets-Sheet 2

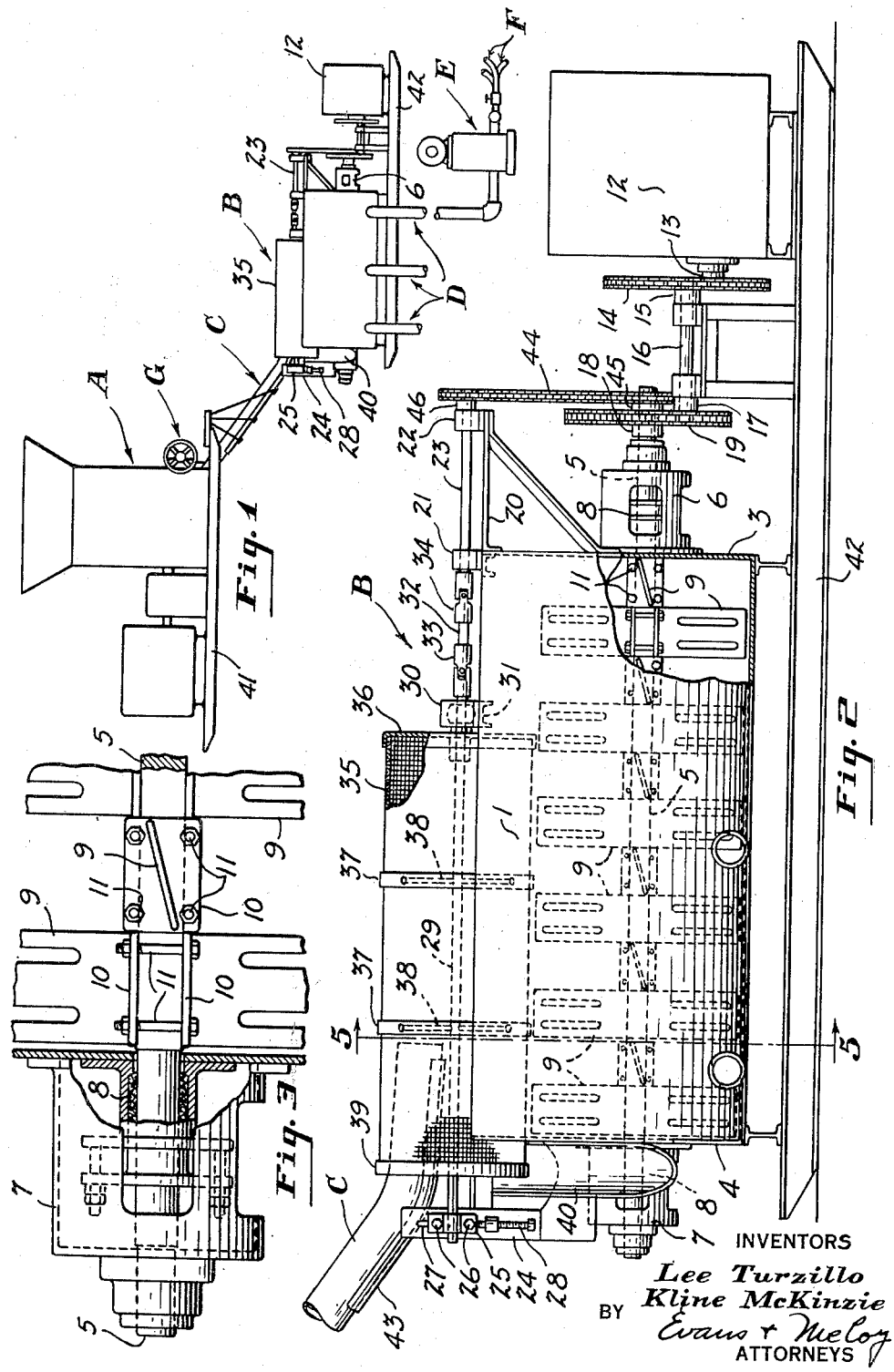

INVENTORS
Lee Turzillo
Kline McKinzie
BY Evans + McCoy
ATTORNEYS

United States Patent Office 2,779,575
Patented Jan. 29, 1957

2,779,575

CONTINUOUS GROUT STRAINER

Lee Turzillo, Bay Village, Ohio, and Kline McKinzie, Chicago, Ill., assignors, by mesne assignments, to Intrusion-Prepakt, Incorporated, Cleveland, Ohio, a corporation of Delaware Application September 18, 1952, Serial No. 310,274

7 Claims. (Cl. 259—152)

This invention relates to a method of and apparatus for supplying a fluent concrete mix to pumps which force the mix through conduits to the cavities in which the concrete is to be placed, and particularly to a method and means for eliminating oversize aggregate from the mix prior to the delivery of the mix to the pumps.

In concrete mixing, transporting and placing installations that employ pumps and conveying conduits it is common practice to provide a primary mixer having manually or automatically controlled mechanisms for feeding thereto the materials employed in the mix in the desired proportions, and a secondary mixer that also serves as a supply receptacle or reservoir from which the mix is drawn by the pumps. In handling the large volumes of grout mortar with the rapidity required in such installations it is difficult to avoid the inclusion of some oversize aggregate in the material delivered to the primary mixer.

The present invention provides a secondary mixer in the form of an elongated open top receptacle having a rotary agitator that extends the full length thereof and a combined agitating and screening device between the primary mixer and the secondary mixer that is in the form of an elongated, tubular rotary screen disposed longitudinally of the receptacle and directly over the top thereof. The tubular screen receives the mix from the primary mixer that is delivered thereto through a gravity conduit which delivers into the interior of the tubular screen intermediate its ends. The tubular screen has one end open to receive the gravity conduit and to permit discharge of oversize aggregate and is disposed with its bottom approximately horizontal so that the oversize aggregate retained therein feeds slowly toward the open end of the tubular screen and is tumbled within the screen during its passage to the open end. The tumbling of the oversize aggregate within the screen serves to agitate the mix and cause it to be discharged from the screen along the length thereof so that there is little or no segregation of materials of the mix due to transfer from the primary mixer to the secondary mixer.

By reason of the fact that the mix is delivered into the secondary mixer along the length thereof rapidly and in a thoroughly mixed condition, the mix in the secondary mixer is more uniform at all times and mortar may be drawn therefrom continuously while the mortar is delivered thereto from the primary mixer at intervals. The tumbling of the oversize aggregate also serves to beat the screen and prevent clogging of its openings and also to dislodge practically all of the fluent mix from the pieces of oversize aggregate before the discharge thereof, thereby reducing the loss of cement due to the screening out of the oversize aggregate from the mix.

The general object of the invention is to eliminate oversize aggregate from the mix without impeding or impairing the operation of the concrete mixing and delivering apparatus.

Specific objects of the invention are to separate out oversize aggregate between the primary and secondary mixers with a minimum loss of cement and to provide a separating device that will so agitate the mix and so deliver it to the secondary mixer that segregation of the materials composing the mix is substantially eliminated and interruption of the pumping of the mix from the secondary mixer is avoided.

Reference should be had to the accompanying drawings forming a part of this specification in which:

Figure 1 is a schematic elevational view showing a concrete mixing and transporting installation embodying the invention:

Fig. 2 is a side elevation of the combined secondary mixer and supply receptacle and the rotary screen mounted thereon;

Fig. 3 is a fragmentary side elevation on an enlarged scale of one of the agitator shaft bearings with a portion of the bearing broken away and shown in section;

Figure 4:
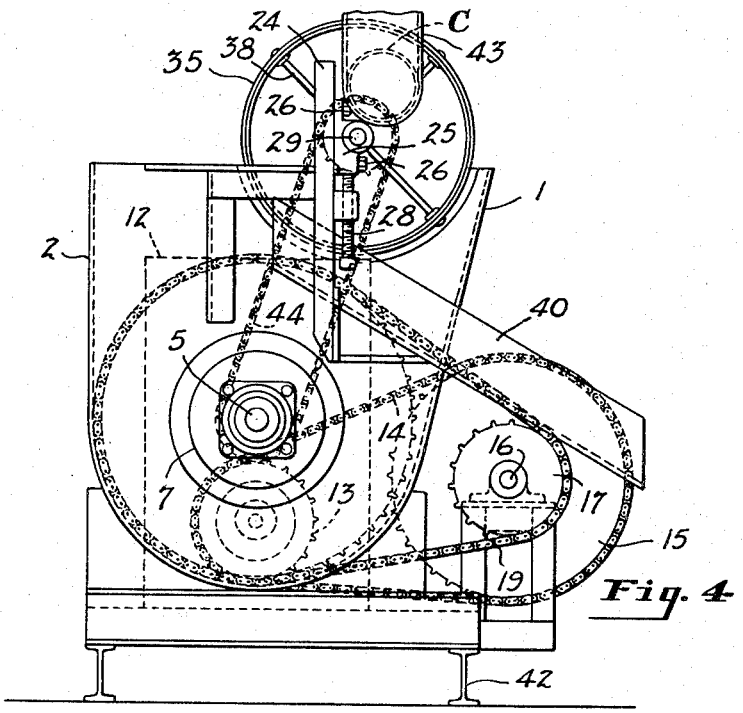
Fig. 4 is an end elevation of the secondary mixer and screen.
Figure 5:
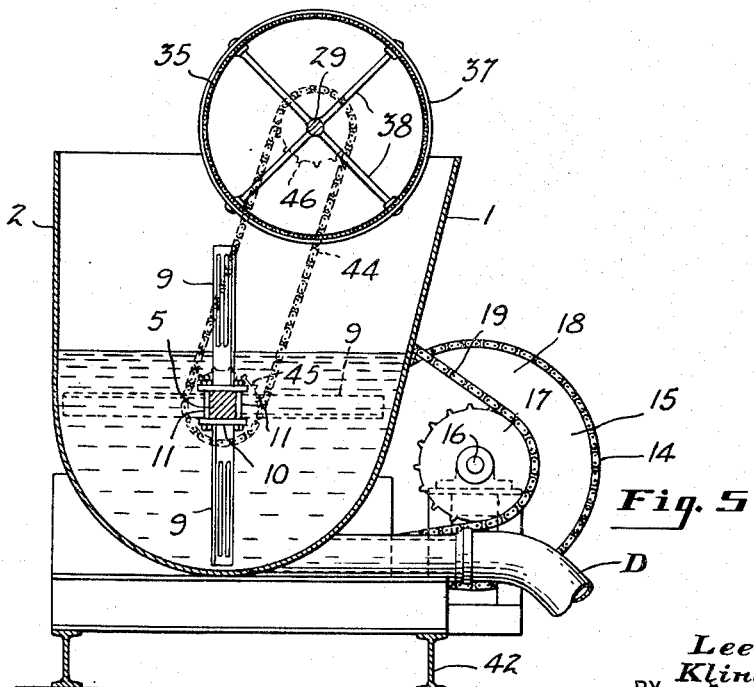
Fig. 5 is a vertical section through the secondary mixer and screen taken on the line indicated at 5—5 in Fig. 2.

In Fig. 1 of the drawings a concrete handling installation is shown which comprises a primary mixer A, a secondary mixer B disposed at a level lower than that of the mixer A, a gravity conduit C for delivering fluent concrete mix from the mixer A to the mixer B, and conduits D leading from the secondary mixer B to pumps which force the fluent mix through delivery conduits, only one pump E and delivery conduit F being shown in Fig. 1.

Suitable manually or automatically controlled means (not shown) are employed for delivering the ingredients of the mix to the mixer A in the desired proportions. After each batch is delivered to the mixer A, the mixer is operated for a sufficient length of time to produce a homogeneous mix, after which the mix may be delivered to the secondary mixer and supply reservoir B by operating a manually operable gate G which controls the flow of material from the mixer A to the gravity conduit C.

The mixer B is in the form of an elongated open-top receptacle having a front wall 1, a rear wall 2 and end walls 3 and 4. An agitator shaft 5 extends longitudinally through the elongated receptacle and is journalled in bearings 6 and 7 attached to the end walls 3 and 4 of the receptacle, the bearings 6 and 7 being provided with suitable glands 8 to prevent leakage of liquid from the receptacle.

The portion of the shaft 5 within the receptacle is square in cross section for convenient attachment of a series of radial vanes 9. Each vane 9 is attached by suitable means such as welding to a base plate 10 of rectangular form. The vanes 9 are perpendicular to the plates 10 and disposed diagonally of the plates. The vanes 9 are disposed in pairs that are diametrically opposite each other with their bases 10 engaging opposite faces of the square shaft 5. The plates 10 are wider than the shaft 5 and opposed plates are attached together by bolts 11 which serve to clamp the plates and vanes to the shaft. The base plates 10 of the vanes abut end to end from one end of the receptacle to the other and successive pairs of base plates 10 are disposed at right angles to dispose each pair of vanes 9 at right angles to the adjacent pair. The agitator of the shaft 5 is driven by an engine 12 through a suitable speed reduction drive.

As herein shown, a small sprocket 13 on the engine shaft drives a sprocket chain 14 which drives a large sprocket 15 on a countershaft 16. A small sprocket 17 attached to the countershaft 16 drives a large sprocket 18 on the shaft 5 through a sprocket chain 19. A bracket 20 on the end wall 3 carries horizontally alined bearings 21 and 22 in which a shaft 23 is journaled. A bracket 24 on the opposite end wall 4 supports a bearing 25 that is attached to the bracket 24 by bolts 26 which extend through a vertical slot 27 in the bracket 24. A vertical adjusting screw 28 engages the lower edge of the bearing 25 for moving the bearing to the desired level when the bolts 26 are loosened.

A shaft 29 journaled in the bearing 25 extends longitudinally of the mixer B and is supported near the end wall 3 by a rocker bearing 30 that is mounted on a cross bar 31 supported on the front and rear walls 1 and 2. The shaft 29 is connected to the shaft 23 through a short shaft 32 that is connected to the shaft 29 by a universal coupling 33 and to the shaft 23 by a universal coupling 34.

The shaft 29 supports an elongated tubular screen 35 that is positioned directly over the mixer B with its bottom approximately horizontal and between the walls 1 and 2. As herein shown the screen is of cylindrical form and the screen and its coaxial supporting shaft 29 are disposed in approximately horizontal position. In operating upon different mixes it may be desirable to adjust the screen 35 to slightly different longitudinal inclinations and toward or away from the discharge end thereof and this adjustment can be effected by vertical adjustment of the bearing 25. The end of the screen 35 adjacent the cross bar 31 is provided with a closure 36 that is attached to the shaft 29 and intermediate the ends thereof the screen is provided with circumferential bands 37 that are connected to the shaft 29 through radial supporting arms 38. The end of the screen adjacent the bracket 24 extends a short distance past the end wall 4 of the mixer B and is provided with a stiffening band 39. The open end of the screen 35 has no connection to the shaft 29 so that the gravity conduit C can extend into the open end of the screen a sufficient distance to discharge the mix into the screen substantially midway between its ends. A chute 40 is attached to the end wall 4 and positioned directly beneath the open end of the screen 35 to receive the oversize aggregate discharging from the open end of the screen.

The primary mixer is supported on a suitable base 41 and the secondary mixer on a suitable base 42 and the conduit C, which is preferably in the form of a flexible hose, is supported on a rigid trough 43 that is suspended from the base 41 of the primary mixer.

The screen 35 is driven from the shaft 5 through a sprocket chain 44 that passes over a sprocket 45 on the shaft 5 and a sprocket 46 on the shaft 23. As herein shown, the sprockets 45 and 46 are the same size so that the speed of rotation of the screen 35 is the same as the speed of rotation of the agitator shaft 5.

When the gate G is opened fluent mix passes from the mixer A through the conduit C and discharges into the central portion of the tubular screen 35. The screen 35 being approximately horizontal, the mix flows toward both ends of the screen and drips through the screen into the mixer B along the major portion of the length thereof. Pieces of oversize aggregate are collected within the screen 35 and this aggregate is tumbled within the screen as the screen rotates, increasing the agitation of the mix as it passes through the screen and tending to equalize the discharge of mix along the length of the screen. The oversize aggregate also has a beating action on the screen which tends to keep the screen apertures open and the tumbling action also tends to free the pieces of oversize aggregate from the fluent cement mix so that the oversize aggregate is discharged in fairly clean condition from the open end of the screen onto the chute 40. The action of the screen on the mix as it passes from the gravity conduit C to the secondary mixer B causes the fluent mix to be delivered along the length of the agitator within the mixer B without any substantial segregation of ingredients so that delivery of a batch of concrete from the primary mixer to the secondary mixer and supply reservoir does not materially affect the uniformity of the mix in the secondary mixer, so that it is unnecessary to stop the pumps after such discharge into the secondary mixer.

The present invention not only separates the oversize aggregate from the mix with a minimum loss of cement, but also makes possible continuous pumping of the fluent mix from the auxiliary mixer.

It is to be understood that in accordance with the provisions of the patent statutes, variations and modifications of the specific devices herein shown and described may be made without departing from the spirit of the invention.

What we claim is:

1. In apparatus for supplying a fluent concrete mix, the combination with a primary concrete mixer and a secondary concrete mixer that comprises an elongated open top receptacle having a rotary agitator therein that extends substantially the full length thereof, of means for delivering the concrete mix from the primary mixer to the secondary mixer and for removing oversize aggregate therefrom comprising an elongated tubular rotary screen directly over said receptacle adjacent its top and extending throughout the major portion of the length thereof, said screen being disposed with its bottom approximately horizontal to cause oversize aggregate to collect and be tumbled therein and having an open end through which the oversize aggregate is discharged, means for rotating said agitator and said screen, and means including a conduit extending into one end of said tubular screen for delivering the concrete mix from said primary mixer directly into the central portion of the tubular screen intermediate its ends whereby the concrete mix is agitated and delivered into said secondary mixer along the length thereof free from oversize aggregate.

2. In apparatus for supplying a fluent concrete mix, the combination with a primary concrete mixer and a secondary concrete mixer that comprises an elongated open top receptacle having a rotary agitator therein that extends substantially the full length thereof, of means for delivering the concrete mix from the primary mixer to the secondary mixer and for removing oversize aggregate therefrom comprising an elongated tubular rotary screen directly over said receptacle adjacent its top and extending throughout the major portion of the length thereof, said screen being disposed with its bottom approximately horizontal to cause oversize aggregate to collect and be tumbled therein and having an open end through which the oversize aggregate is discharged, means for rotating said agitator and said screen, means for vertically adjusting an end of said tubular screen to vary its longitudinal inclination, and means for delivering the mix from said primary mixer directly into the central portion of the tubular screen intermediate its ends.

3. In apparatus for supplying a fluent concrete mix, the combination with a primary concrete mixer and a secondary concrete mixer below the primary mixer that comprises an elongated open top receptacle having a rotary agitator that extends substantially the full length thereof and having side and end walls that project above said agitator, of means for delivering the concrete mix from the primary mixer to the secondary mixer and for removing oversize aggregate therefrom comprising an elongated tubular rotary screen above said agitator and between the side walls of said receptacle, said screen extending longitudinally of said receptacle and having its bottom approximately horizontal, said tubular screen having a closed end and an open end for discharge of oversize aggregate beyond an end of said receptacle, a gravity conduit positioned to receive the concrete mix from the primary mixer and extending into the open end of said tubular screen so as to discharge the concrete mix directly into the central portion of said screen, means for driving said agitator, and a driving connection between said agitator and said screen.

4. In apparatus for supplying a fluent concrete mix, the combination with a primary concrete mixer and a secondary concrete mixer below said primary mixer that comprises an elongated open top receptacle having an agitator therein consisting of a horizontal shaft extending longitudinally through said receptacle and radial vanes closely spaced longitudinally of the shaft throughout the length of the receptacle, an approximately horizontal elongated cylindrical screen directly above said receptacle and extending longitudinally thereof, one end of said cylindrical screen being open and projecting a short distance beyond an end of said receptacle, said screen extending over a major portion of the length of said receptacle, a supporting shaft extending axially through said screen, radial arms attached to said screen and said supporting shaft inwardly of said open end of said screen, a gravity conduit for delivering the concrete mix from said primary mixer to said screen extending into the open end of said cylindrical screen to deliver the mix directly into the central portion of the screen intermediate its ends, means for driving said agitator shaft, and a driving connection from said agitator shaft to said screen supporting shaft.

5. Apparatus for supplying a fluent concrete mix to a secondary concrete mixer from which the concrete mix is to be pumped to its place of use, comprising, in combination: a secondary concrete mixer, a rotary tubular screen having an open and a closed end and a lower surface which is generally horizontal, means for delivering a fluent substantially homogeneous concrete mix containing pieces of oversize aggregate directly to said screen substantially midway between said open and closed end, and means for continuously rotating said screen to tumble the oversize aggregate until the fluent mix is dislodged therefrom and the oversize aggregate in a substantially clean condition can be removed through the open end.

6. Apparatus for supplying a fluent concrete mix to a secondary concrete mixer and storage container, comprising, in combination: a rotary tubular screen supported for rotation with the lower surface of the screen being approximately horizontal, means for rotating the screen and means for delivering a fluent substantially uniform concrete mix containing pieces of oversize aggregate directly to the central portion of said screen whereby the fluent mix flows toward both ends of the screen and drips through the screen along the major portion of the length thereof, said secondary mixer being arranged to receive such portions dripping through the screen, the rotation of the screen also causing a tumbling of the aggregate of a size larger than the openings of the screen to produce a beating action on the screen and keep the screen apertures open, the tumbling also shaking the oversize aggregate to remove substantially all of the fluid concrete mix therefrom whereby a substantially uniform concrete mix is delivered to the secondary mixer and the loss of concrete on the oversize aggregate is minimized.

7. Apparatus for supplying a fluent concrete mix, comprising in combination: a primary concrete mixer, a secondary concrete mixer including a receptacle and a rotary agitator therein, and means for delivering concrete mix from the primary mixer to the secondary mixer and for removing oversize aggregate therefrom, comprising an elongated tubular rotary screen so arranged as to have material passing through the apertures of the screen pass into said receptacle, said screen being disposed with its bottom approximately horizontal to cause oversize aggregate to collect and be tumbled therein and having an open end through which the oversize aggregate is discharged, said screen also having a closed end, means for rotating said agitator and said screen and means including a conduit extending into one end of said tubular screen for delivering the concrete mix from the primary mixer directly into the central portion of the tubular screen here immediate its ends whereby the concrete mix will be agitated and delivered into said secondary mixer along the length thereof free from oversize aggregate.

References Cited in the file of this patent

UNITED STATES PATENTS

| | | |
|---|---|---|
| 141,947 | Pierce | Aug. 19, 1873 |
| 752,646 | Boughton | Feb. 23, 1904 |
| 949,536 | Herrick | Feb. 15, 1910 |
| 2,249,109 | Botimer | July 15, 1941 |
| 2,533,852 | Tietig | Dec. 12, 1950 |